United States Patent [19]
Braidich et al.

[11] 3,873,480
[45] Mar. 25, 1975

[54] NOVEL PAPER COATING COMPOSITIONS CONTAINING 1,2 EPOXIDE MODIFIED FREE-CARBOXYL CONTAINING CO-POLYMERS

[75] Inventors: Emery V. Braidich, Tallmadge; George T. Gmitter, Akron; William J. van Essen, Tallmadge, all of Ohio

[73] Assignee: The General Tire & Rubber Company, Akron, Ohio

[22] Filed: Nov. 30, 1972

[21] Appl. No.: 310,754

[52] U.S. Cl............ 260/17.4 ST, 117/155 UA, 117/161 UT, 117/161 ZB, 260/8, 260/17.4 BB 260/17.4 R, 260/29.6 RW, 260/29.6 WA, 260/29.7 WA
[51] Int. Cl............................................ C08d 9/06
[58] Field of Search . 260/17.4 ST, 17.4 R, 17.4 BB, 260/29.6 RW, 29.6 WA, 29.7 WA; 117/161 ZB, 161 UT, 155 UA

[56] References Cited
UNITED STATES PATENTS

| | | | |
|---|---|---|---|
| 2,662,870 | 12/1953 | Clement | 117/161 |
| 3,057,812 | 10/1962 | Straughan | 260/29.6 |
| 3,100,160 | 8/1963 | Korpman | 117/122 |
| 3,238,170 | 3/1966 | Wolff et al. | 260/29.6 |
| 3,404,116 | 10/1968 | Pueschner | 260/29.7 |
| 3,409,569 | 11/1968 | Lane et al. | 260/8 |
| 3,711,437 | 1/1973 | Wieland et al. | 260/29.7 W |

*Primary Examiner*—Melvin Goldstein
*Assistant Examiner*—Edward Woodberry

[57] ABSTRACT

In a copolymer latex for use as a binder in paper coatings the copolymer prepared from ethylenically unsaturated monomers consisting of a monovinyl aromatic hydrocarbon monomer, an aliphatic conjugated diene hydrocarbon and an unsaturated mono- or di-carboxylic acid is modified by reaction with an epoxide prior to addition of any other colloidal water-dispersible polymer or fillers and/or pigments to produce a coating composition which has controlled viscosity and reactive groups as sites for additional crosslinking if necessary.

10 Claims, No Drawings

NOVEL PAPER COATING COMPOSITIONS CONTAINING 1,2 EPOXIDE MODIFIED FREE-CARBOXYL CONTAINING CO-POLYMERS

BACKGROUND OF THE INVENTION

Colloidal dispersions of certain types of polymer particles in an aqueous medium, commonly called latices, when formulated with other colloidal water-dispersible polymers, pigments, fillers and other ingredients form valuable compositions that are commercially used in coatings or as impregnants and binders for pigments to paper substrates. Prior to this invention one method for making such useful compositions consisted of the addition of carboxylated latices to certain such water-dispersible polymers, such as starch, polyvinyl alcohol and casein, together with pigments and other ingredients such as fillers, preservatives, stabilizers and the like to yield adhesive compositions which had good coating flow characteristics and which were intended to make paper substrates receptive to printing inks and to bind pigments to paper. Such addition of highly carboxylated latices to such water-dispersible polymers usually resulted in highly viscous binder systems due to an uncontrollable and unwanted viscosity increase within a very short period of time by the interaction of the carboxylated latices with polyvalent metal ions present in the water as well as with certain water-dispersible polymers such as starch. This viscosity increase has led to several difficulties that seriously restrict the useful application of the latices. For example, these highly viscous binder systems must be diluted to obtain workable viscosities. This dilution of these viscous systems resulted in slower paper coating speeds due to the increased drying time required for eliminating the diluent and also in viscosity changes during processing that makes it difficult to effectively control paper coating weights. The prior art attempted to overcome this unwanted viscosity increase, but prior to this invention the attempts have not been too successful. For example, one attempt consisted in decreasing the number of carboxyl groups by partially or totally eliminating the amount of acidic monomer during polymerization to reduce interactions between the carboxyl groups and the water-dispersible polymer or metal ions that resulted in viscosity increases. This attempt has not produced acceptable results because of a loss of binder strength for the system. Other attempts used to prevent viscosity increases have also yielded poorly workable systems. In addition, while crosslinking sites have been possible in previous systems by the introduction of such monomers as hydroxypropyl methacrylate during preparation of latex polymers, such monomers are not economically attractive. In view of these problems a critical need exists for acceptable and workable binder systems that essentially overcome the difficulties frequently associated with the prior art binder systems.

With regard to the systems employed in this invention, reference is made to such prior art as U.S. Pat. Nos. 2,426,125; 2,463,824; 2,494,912; 2,607,771 and 3,150,112.

SUMMARY OF THE INVENTION

This invention comprises novel improved latex compositions comprising a copolymer prepared from ethylenically unsaturated monomers consisting of a monovinyl aromatic hydrocarbon, an aliphatic conjugated diene hydrocarbon and an unsaturated mono- or di-carboxylic acid in which most of the carboxyl groups have been modified into a substantially non-ionic form after copolymerization, another colloidal water-dispersible polymer, pigments and/or fillers and other ingredients, which compositions have desirable properties and are useful as paper and board coating compositions, binders for pigments and/or fillers to paper and the like. Modification of the carboxyl groups of the latex copolymer essentially eliminates or reduces interaction between the copolymer carboxyl groups, the other colloidal water-dispersible polymer and the fillers and other ingredients in the presence of water to yield a binder system having improved, operable and useful properties and having desirable crosslinking sites introduced economically into the system. This invention also comprises a method of preparation of the subject composition as well as coated articles prepared by using the subject composition.

The object of this invention is to provide improved latex systems characterized by a desirable community of properties such as stability, viscosity and the like that imparts good flow characteristics for binding pigment to paper, that controls absorption of printing ink into paper so coated that improves binder strength and other like properties that make the latex systems valuable compositions of matter for commercial use in the coating, paper, printing and paper packaging industries.

This object and other objects which are apparent from the following description are satisfied by this invention.

DESCRIPTION OF THE PREFERRED EMBODIMENTS

In attaining the objects, advantages and other features of this invention, it has now been discovered that an improved latex paper coating composition is obtained by taking the latex of a copolymer prepared from a substituted or unsubstituted monovinyl aromatic hydrocarbon monomer, an aliphatic conjugated diene hydrocarbon monomer and an unsaturated mono- or di-carboxylic acid monomer, reacting most of the carboxyl groups in said copolymer with an epoxide after the latex preparation, then mixing the resulting latex with another colloidal water-dispersible polymer, a pigment and other coating ingredients to yield an improved paper coating composition. That is, the use of a modified carboxylated polymer latex wherein a large percentage of the carboxyl groups are modified to a non-ionic form results in a latex having improved compatibility with both the other colloidal water-dispersible polymer and the pigment and/or filler and having a highly desirable sought-after characteristic of low viscosity as well as crosslinkability.

The monovinyl aromatic hydrocarbon monomer and substituted derivatives thereof as used herein can be any aromatic hydrocarbon which contains a

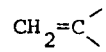

group including styrene, styrenes substituted with halogen atoms and/or lower alkyl, lower alkoxy or cyano groups, vinyl toluene, vinyl naphthalene and the like. Specific examples of the styrenes, which are preferred, include, in addition to styrene, such monomers as alpha-methyl-styrene, p-methyl-styrene, m-ethylstyrene, tert-butyl styrene, m-hexyl-styrene, o,p-dimethyl-styrene, o,p-diethyl-styrene, p-chloro-styrene, o-isopropyl-styrene, o-ethyl-p-butyl-styrene, o,p-di-chloro-styrene, 4-methoxy-styrene, cyanostyrene and the like. Preferably, there are no more than a total of three alkyl groups, alkoxy groups and halogen atoms per vinyl aromatic monomer, and any alkyl or alkoxy group preferably has no more than 2 carbon atoms.

The aliphatic conjugated diene hydrocarbon monomer can be any aliphatic hydrocarbon having 4 to 20 carbon atoms and at least two ethylenic bonds in conjugated relationship. The preferred dienes are, for example, 1,3-butadiene, isoprene, 2,3-dimethylbutadiene-1,3, 2-neopentylbutadiene-1,3, chloroprene and 2-cyano-butadiene-1,3, but monomers such as piperylene, chloropentadiene, the numerous known conjugated hexadienes, heptadiene, 7-methyl-2,4-octadiene and the like can be used.

The unsaturated monocarboxylic acid or dicarboxylic acid monomer can be any such carboxylic acid having aliphatic unsaturation. Examples of suitable unsaturated monocarboxylic acids include acrylic acid, methacrylic acid, ethacrylic acid, propacrylic acid, 2-chloroacrylic acid, cinnamic acid, sorbic acid, crotonic acid and the like. Examples of suitable unsaturated dicarboxylic acids include maleic acid, fumaric acid, itaconic acid, citraconic acid and mesaconic acid. Other unsaturated acids can be included in the latex copolymer if they are included in such small amounts as not to affect the desirable characteristics of the copolymer. Such acids include other organic acids like vinyl sulfonic acid, vinyl phosphonic acid and the like.

The copolymers suitable for the present invention and the corresponding latices are prepared by art known processes as described, for example, in U.S. Pat. Nos. 2,868,754; 2,959,821; 3,177,173; 3,404,116; 3,409,569 and the references cited therein. For example, the polymers can be prepared by emulsion polymerization techniques including both continuous and batchwise polymerization processes. In the batch process the monomeric materials are dispersed in increments or as a single charge in an aqueous phase containing a free radical polymerization catalyst and an emulsifying agent for the monomers in an aqueous phase. The polymerization is carried out until polymerization is complete. In the continuous polymerization technique the monomers are added continuously or incrementally to the first of a series of reactors, and as polymerization continues, polymer latices are removed from the last reactor, additional monomers and/or other ingredients being added where desired during the process. Other techniques that can be used for polymerization include seed polymerization. In the seed technique, a small amount of a previously polymerized latex is mixed with the monomers to be polymerized and the polymerization is continued by art known steps.

After formation of the latex using the unmodified copolymer the free carboxyl groups from the acid monomer are substantially reacted with an epoxide to modify the carboxyl groups partially or totally, resulting in apparently reduced hydrogen and/or ionic bonding between the latex and the other colloidal water-dispersible polymer and/or pigments present in the emulsion. The term "epoxide" includes all compounds incorporating the oxirane structure, a three-membered ring containing one oxygen atom and two carbon atoms, as represented by the formula

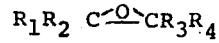

in which $R_1$, $R_2$, $R_3$ and $R_4$ are the same or different and can be hydrogen atoms, lower alkyl groups of 1 to 7 carbon atoms, lower alkoxy or ether groups of 1 to 7 carbon atoms, lower alkenyl groups of 2 to 8 carbon atoms, cycloalkyl groups of 3 to 7 carbon atoms, aralkyl groups of 6 to 10 carbon atoms, halogen- and cyano-substituted alkyl, alkoxy or alkenyl groups, aromatic groups and the like. Preferably, $R_2$, $R_3$ and $R_4$ are hydrogen atoms. Examples of suitable epoxides include ethylene oxide, propylene oxide, butylene oxide, epichlorohydrin, 1,2-epoxyethyl-benzene, 1,2-epoxy-3-methylbutane, 1,2-epoxyhexane, 2,3-epoxybutane, 1,2-epoxy-3-methyl-4-chlorobutane and the like. Other epoxides include diepoxides such as 1,2,3,4-diepoxybutane, vinylcyclohexene dioxide, and epoxides such as 1,2-cyclopentene oxide, 1,2-cyclohexene oxide and the like.

The reaction of the epoxide group and the carboxyl group is conveniently carried out by contacting and reacting the reactants by processes known to the art. For example, one process is comprised of reacting the carboxylated polymer in latex form and the epoxide in a contacting vessel provided with a stirring apparatus to insure complete contact between the components of the reaction mixture. Means to control the temperature, such as a jacket for heating and cooling, should be provided. The feasible temperature range for reacting the carboxyl moieties and the oxides to yield the corresponding ester is from about 25°C. to 90°C. for 2 to 18 hours. The amount of epoxide used for the modification will be an amount equivalent to, slightly less than or greater than the carboxylic acid content of the latex depending on the intended use of the final product. The system is preferably adjusted to and maintained in the pH range of about 5 to 10, more preferably 6 to 9, by the use of a base such as ammonia as shown below, although such bases as sodium hydroxide or potassium hydroxide or the corresponding carbonates can be used.

The term "colloidal water-dispersible polymer" includes all colloidal water-dispersible polymers other than the copolymers described above and derived from both natural and synthetic origins, such as casein and other proteins, poly(vinyl alcohol) and the starches, such as corn, potato, tapioca, arrowroot, proteolytically- or enzymatically-treated starches and other modified starches.

The term "other ingredients" as used herein broadly includes preservatives, stabilizers, antifoaming agents and other surfactants and other conventional ingredients that are normally employed in compounding water-based paper or other coating systems.

The term "pigment" is used herein broadly to include fillers and includes clays, calcium carbonates, titanium dioxide, zinc oxide, lithopone, as well as colored pigments such as iron blue, chrome yellow, cadmium yellow, molybdate orange and the like.

For the purposes of the invention the latex copolymer will have a compositional range of about 20 to 80 percent by weight of the vinyl monomer, about 15 to 60 percent by weight of the diene monomer and about 0.5 to 20 percent by weight of the modified carboxylic acid. The desired paper coating composition broadly consists on a dry basis of up to 20 percent by weight of total modified latex copolymer and other colloidal water-dispersible polymer and at least 80 percent by weight of pigment with, optionally, about 0.5 to 15 percent by weight of other ingredients. Generally, the coating compositions have a solids content between 20 and 70 percent by weight.

The most important single property of the adhesive is pigment binding strength. This property measures the strength of the bond between the paper and the coating materials which in turn is the prime determinant of the overall quality of the paper. This property, generally referred to as dry pick resistance, is measured by a machine designated as the IGT printability tester. This machine, as well as the test for determining pigment binding strength, has been described in the February 1956 issue of the American Pressman. Another machine used to determine this property of pigment binding strength is the MP print tester, and the results obtained on this machine can be correlated to the results obtained using the IGT tester. The pigment binding strength is determined by finding, using a specified ink, the highest printing speed which can be used before picking starts. The higher the speed the more desirable the adhesive.

The calendered gloss is an important property, the higher the gloss, the more desirable the adhesive. The standard test for determining this property is TAPPI Std. T480m–51. With respect to this property, as well as the pigment binding strength, the standard of comparison is casein. Any new material should be at least comparable with and preferably better than casein.

Opacity, which is measured by TAPPI Std. T425m–60 should be as high as possible. Brightness is also an important property, and the higher it is, the more desirable is the adhesive. It is determined by TAPPI Std. T452m–58. The standard of comparison for both opacity and brightness is a 60/40 styrene-butadiene latex.

Wet pick is another important property because it determines whether the latex can be used in the modern high speed printing presses. The test used is substantially the same as the "piling propensity" test described by Oehme and Nepper in TAPPI, vol. 43, No. 10 (October 1960), pp. 174A–176A.

The advantages and benefits of the improved latexes of this invention will be more apparent from the following illustrative examples which are set forth for this purpose and are not to be considered as limiting the scope of the invention. Unless otherwise stated, all quantitative measurements are by weight.

EXAMPLE I

The modification of the carboxyl groups of a latex was carried out as follows: First, a monomeric mixture comprised of 44 parts of butadiene, 26 parts of styrene, 10 parts of acrylonitrile and 20.0 parts of methacrylic acid was dispersed with 150 parts of water, 0.3 part of azobisisobutyronitrile, 6.0 parts of t-dodecyl mercaptan, and a surfactant system consisting of 1.5 parts of a commercial sodium 2-ethylhexyl sulfate and 1.5 parts of nonylphenoxy (ethyleneoxy) ethanol were charged into a 250 gallon reactor. Next, the reactor's temperature was raised to 50°C. and the polymerization reaction continued for 17 hours. Then, this latex was steam stripped after partial neutralization with ammonia to a pH of 5.4 to yield a latex having 39.2 percent solids.

The latex was then modified by mixing 10.6 parts by weight of propylene oxide and 200 parts by weight of the just prepared latex solid into a one pint pressure vessel and continually stirring the reactants at room temperature for 30 to 60 minutes. Then, the vessel was placed in a 60°C. water bath for 4½ hours, followed by an additional 2 hours in the bath at 70°C. This resulted in an increase in pH from 5.4 to 7.8 indicating the partial disappearance of the carboxyl groups.

Next, 100 parts of the modified latex was diluted to 10 percent by weight with concentrated ammonium hydroxide by adjusting the pH to 9.0. To this was added 100 parts of a colloidal water-dispersible polymer in the form of a 10 percent oxidized starch solution, and the initial viscosity was ascertained at 25°C. with a Brookfield viscometer to be 47 centipoises.

The viscosity was measured after standing overnight at 25°C. and determined to be 129 cps. The same modified latex starch composition was heated for 8 hours at 120°C. and resulted in a final viscosity at 25°C. of 62 cps.

By way of comparison, a similar experiment using non-modified latex mixed with the same starch had an initial visocisty of 7,700 cps. and a final viscosity after standing 18 hours at 25°C. of 45,500 cps.

EXAMPLE II

To 197.5 parts of the latex of Example I, the latex being diluted to a solids content of 20 percent with the pH adjusted to 9.1 with concentrated NH$_4$OH, was mixed 5.3 parts by weight of propylene oxide and the carboxylated polymer modified by reaction for 16 hours at 70°C. Then, 100 grams of the modified polymer was diluted with water to 10 percent by weight and was mixed with 100 grams of a 10 percent oxidized starch solution to yield a composition having an initial viscosity at 25°C. of 27 cps. and a viscosity after 20 hours at 25°C. of 47 cps. This composition was heated for 6 hours with constant stirring at 120°F. and it resulted in a final viscosity of 39 cps. The purpose of heating at 120°F. for such an extended period was to simulate the temperature conditions during paper mill application procedures. Under such conditions if the viscosity of the coating composition varies to any great extent, the weight of the resulting applied coating will also vary.

This example shows that the viscosity can be controlled to the same general order of magnitude by the modification procedure of this invention even when using a colloidal water-dispersible polymer, which resulted from raising the pH to 9.1. When the polymer becomes colloidally water-dispersible, the carboxyl groups are more readily available to interact with the starch or other reactive colloidal water-dispersible polymer, but such interaction is still inhibited by the procedure of this invention.

EXAMPLE III

The improved stability and viscosity with a pigment was determined as follows: First, a conventional styrene-butadiene latex containing 2 weight percent of itaconic acid was mixed in a typical paper coating recipe. The addition of the latex to the binder recipe was carried out by mixing 100 parts by weight of clay (predispersed Georgia-kaolin/CaCO$_3$—85/15 ratio containing 0.23 weight percent of tetrasodium pyrophosphate decahydrate) with 7 parts by weight of hydroxyethylated starch in a 20 percent solution, and 7 parts by weight of latex solids and water to result in a 47 percent solids content. The mixture had an original viscosity at 25°C. of 175 cps. and after heating 8 hours at 120°F. a viscosity at 25°C. in excess of 10,000 cps.

Repeating the experiment without the hydroxyethylated starch with all the conditions as described resulted in a final viscosity slightly in excess of 5,000 cps. Also, by additionally eliminating the calcium carbonate in the pigment slurry, the viscosity increased from an original value of 15 cps. to a final value of 17 cps. These results demonstrate the interaction between the starch, calcium carbonate and the carboxylated latex.

Again, by way of comparison, the above procedure was repeated by substituting for the non-modified latex a propylene oxide-modified latex in a starch-free recipe containing $CaCO_3$ resulting in an initial viscosity of 10 cps. and a final viscosity of 12.5 cps. at 25°C. after heating 8 hours at 120°F. The experiment was again repeated with the propylene oxide-modified latex in a recipe containing both calcium carbonate and starch, and the measured initial viscosity was 162 cps. and the final viscosity after heating was 190 cps.

The improved results obtained by using the process of the invention are further illustrated by reference to accompanying Table I, immediately below. In Table I, the starch is commercially available hydroxyethylated starch, the clay is Georgia kaolin clay, the viscosities were measured as cps. at 25°C. initial and final 8 hours after heating at 120°F. the coating dispersions contained 0.23 weight percent of tetrasodium pyrophosphate dispersant for latices in Runs A through E and 0.5 weight percent of a zinc modified sodium hexametaphosphate dispersant (Calgon T) in Runs F and G based on the total weight of pigment. The latter two experiments show the improved stability that the epoxide-modified latex has towards another multivalent ion pigment, namely ZnO.

In Table II the above propylene oxide-modified styrene-butadiene-itaconic acid copolymer latex is compared with the non-modified latex as a binder in a starch-based paper coating system. The non-modified latex was employed in Run H, and the propylene oxide-modified latex was employed in Run J. In Runs K and L the starch was replaced with a different colloidal water-dispersible polymer, namely casein, showing that the modified latices can also be used with casein and still be comparable to the starch-based system. The latices were coated on a starch-impregnated paper substrate with a conventional Meyer Bar at 10 lbs./ream coating weight and calendered. The coating consists of 100 parts by weight of clay/$CaCO_3$ (85/15) pigment, 7 parts by weight of starch or 5 parts of casein, and 7 parts of latex solids. The data show unexpected increases in IGT pick values with an increase of from 265 feet per minute with non-modified latex to about 350 feet per minute with modified latex in the starch-latex system, while in a corresponding casein-latex coating system the modified latex gives a comparable value.

TABLE II

| Run | Latex | IGT Pick (FT/Min) 4 Tack Ink, M Speed 50 Kgs. Pressure |
|---|---|---|
| H | Unmodified | 265 |
| J | Modified | 350 |
| K | Unmodified | 330 |
| L | Modified | 315 |

In Table III the results obtained by altering the amount of propylene oxide (P.O.) modifier and the modification time are set forth for various systems. All the runs involve a dual carboxylic acid system in which the latex polymer was prepared from one part of methacrylic acid, two parts of itaconic acid, 47 parts of styrene and 50 parts of butadiene. In all the runs the binder/pigment ratio was 15/100. All papers were starch-impregnated and were coated on the wire side at 10 lbs./ream coating weight and force dried, and the coating colors prepared at a pH 9–9.3. Brightness values were 80.0 ± 0.5. The starch-polymer solids ratio was 12/3 in Runs M, N and O and 9/6 in Runs P, Q and R, and the total solids content was 43.2 percent. The pigment consisted of 80/20 clay-$CaCO_3$ dispersed with 1.5 parts of zinc modified sodium hexametaphosphate (Calgon T) per 100 parts of pigment. Initial and final

TABLE I

| Run | Latex | Parts Latex | Parts Starch | Pigments (Parts) Clay | $CaCO_3$ | ZnO | Viscosities (cps) Initial | Final |
|---|---|---|---|---|---|---|---|---|
| A | Unmodified styrene-butadiene-itaconic acid | 7 | 7 | 85 | 15 | — | 175 | >10,000 |
| B | " | 7 | — | 85 | 15 | — | 15 | >5,000 |
| C | " | 7 | — | 100 | — | — | 15 | 17 |
| D | Oxide modified styrene-butadiene-itaconic acid | 7 | — | 85 | 15 | — | 10 | 12.5 |
| E | " | 7 | 7 | 85 | 15 | — | 162 | 190 |
| F | Oxide modified styrene-butadiene-methacrylic acid | 7 | — | 80 | — | 20 | 14 | 15 |
| G | Unmodified styrene-butadiene-methacrylic acid | 7 | — | 80 | — | 20 | 15 | 5,000 | viscosity figures refer to viscosities before and after heating 8 hours at 120°F.

These data show that although viscosity stability can be attained with latices containing a low level of carboxyl groups by the addition of dispersants such as Calgon T, improved IGT pick and wet rub resistance can also be obtained with equivalent or improved opacity and gloss values by this invention. These improvements are attainable at more than one ratio of latex polymer to other colloidal water-dispersible polymer.

TABLE III

| Run | Parts P.O/100 Parts Latex Solids | Reaction Time(hours) | Viscosity(cps) Initial | Viscosity(cps) Final | IGT Pick F/M | 75° Gloss | Opacity | Wet Rub Mgs. Removed |
| --- | --- | --- | --- | --- | --- | --- | --- | --- |
| M | — | — | 160 | | 325 | 65.9 | 92.6 | — |
| N | 1.84 | 16 | 170 | | 425 | 65.9 | 93.2 | — |
| O | 2.49 | 4 | 150 | | 415 | 66.4 | 94.3 | — |
| P | — | — | 120 | 100 | 450 | 67.8 | 93.2 | 18 |
| Q | 1.84 | 16 | 140 | 135 | 525 | 68.4 | 93.2 | 15 |
| R | 2.49 | 4 | 120 | 115 | 535 | 68.0 | 93.2 | 12 |

In Table IV is set forth the results obtained using latex copolymers of 50 weight percent butadiene, 48 weight percent styrene and 2 weight percent itaconic acid modified with butylene oxide, epichlorohydrin and styrene oxide and containing 0.4 weight percent mixed tertiary mercaptans, 0.4 weight percent $(NH_4)_2S_2O_8$, 0.12 weight percent of a commercial sodium dodecyl benzene sulfonate, 0.4 weight percent of a commercial sodium 2-ethylhexyl sulfate and 113 weight percent water based on the weight of latex solids. The coating compositions consisted of 100 parts by weight of clay/-$CaCO_3$ (85/15 ratio), 9 parts of starch and 6 parts of polymer solids. The coating colors were diluted to 43 percent, and viscosity differences after the heat stability test were not large. All papers were starch-impregnated and coated on the wire side at 10 lbs./ream with a Meyer rod. The purpose of these runs was to show that other epoxides could be used. The resulting coated papers were air dried and force dried, calendered and the readings obtained under both conditions as set forth in the table. Note that the control showed much greater viscosity variation than the modified polymers.

heated 4 hours at 85°C. and then incorporated into coating compositions having a solids content of 100 parts of a commercial small particle kaolin clay (0.3 micron average) (Ultra Gloss 90), 8 parts of a commercial medium viscosity oxidized starch (Stayco M), 8 parts of latex polymer and 1.25 parts of 40 percent glyoxal solution in water. The coating compositions were applied as 50 percent solids dispersions in water to starch-impregnated paper with a Meyer bar at a 10 lb./ream coating weight. Wet rub values were determined by light transmission measurement of the residue from the Thwing-Albert Wet Rub Tester. Higher transmission values mean less residue was removed from the coated paper, and these phenomena are correlated with higher levels of crosslinking.

TABLE V

| Run | Functional Monomers IA/MAA/HEMA/EO | Wet Rub (% Transmission) |
| --- | --- | --- |
| W | 2.25/0.75/-/- | 42.5 |
| X | 2.25/0.75/-/1.95 | 73.0 |
| Y | 2.25/0.75/1.75/- | 60.0 |

TABLE IV

| Run | Epoxide | Viscosity(cps) Initial | Viscosity(cps) Final* | Air Dried | Force Dried | Brightness | Opacity | 75% Gloss | IGT Pick F/M 5 Tack Ink B Speed 50 Kgs/ Press. |
| --- | --- | --- | --- | --- | --- | --- | --- | --- | --- |
| S | Butylene Oxide | 180 | 184 | x | | 77.7 | 93.0 | 73.6 | 560 |
| | | | | | x | 78.0 | 93.5 | 75.8 | 510 |
| T | Epichlorohydrin | 160 | 172 | x | | 77.2 | 92.5 | 75.7 | 615 |
| | | | | | x | 77.2 | 92.5 | 74.7 | 525 |
| U | Styrene Oxide | 182 | 172 | x | | 77.8 | 93.5 | 75.3 | 585 |
| | | | | | x | 77.3 | 93.0 | 74.6 | 520 |
| V | Propylene Oxide | 160 | 147 | x | | 78.3 | 93.0 | 73.7 | 595 |
| | | | | | x | 77.0 | 93.0 | 76.3 | 510 |
| Control | | 180 | 155 | x | | 78.0 | 93.5 | 74.2 | 560 |
| | | | | | x | 78.3 | 94.0 | 75.2 | 510 |

* after 8 hours at 120°F.

The reaction of an epoxide with a carboxylic acid group to form a hydroxyalkyl ester group on a latex polymer chain produces a site for crosslinking with materials which react with hydroxyl groups. Wet rub and wet pick properties are directly related to the extent of such crosslinking. These properties are measured to determine the resistance of coated paper to rubbing or scuffing when wet such as takes place during offset printing.

In the following runs the latices evaluated were of a low acid lelvel, and Table V shows the improvement in wet properties obtained by crosslinking a latex polymer modified with ethylene oxide with a dialdehyde, namely glyoxal. The latex polymers were copolymers of about 65 parts of styrene, 30 parts of butadiene and the stated amounts of itaconic acid (IA), methacrylic acid (MAA), hydroxethyl methacrylate (HEMA) and/or ethylene oxide modifier (EO). All the latices were These data show that with the ethylene oxide modification percent wet rub resistance improves, indicating an increasing amount of crosslinking due to the presence of a larger level of hydroxyethyl esters available for crosslinking with the glyoxal. This is verified by comparing oxide-modified Run X with Run Y in which hydroxyethyl methacrylate was added during the latex polymerization for crosslinking with the glyoxal. Runs X and Y have better wet rub due to crosslinking than Run W, which does not employ an epoxide-modified polymer nor does it contain hydroxyethyl methacrylate.

Evaluation of ethylene oxide-modified latices as binders wherein the latex copolymers were crosslinked with a commercial 70 weight percent solution in water of a urea-formaldehyde resin is set forth in Table VI. Wet pick values were determined by using a modified version of the IGT Pick Test as described in TAPPI Journal, vol. 50, No. 12, pg. 622, December, 1967. Higher values signify greater wet pick resistance and correlate with a greater level of crosslinking.

All coating compositions contained as solids the *Ultra Gloss* clay pigment of Runs W, X and Y, latex copolymer and commercial urea-formaldehyde resin solution in a weight ratio of 100/10/1.13 and were applied as 50 percent solids dispersions at 10 lbs./ream to starch-impregnated paper with a Meyer bar or rod. The latex copolymers contained 65 parts of styrene, 30 parts of butadiene and the noted parts of functional monomers identified by the same abbreviations used in Table V. All the ethylene oxide-modified latices were reacted 4 hours at 85°C.

TABLE VI

| Run | Functional Monomers IA/MAA/HEMA/EO | Wet Pick Value |
|---|---|---|
| Z' | 2.25/0.75/1.75/2.0 | 8 |
| A' | 2.25/0.75/1.75/- | 7+ |
| B' | 2.25/0.75/-/1.95 | 8 |
| C' | 2.25/0.75/-/- | 7 |

The data show the ethylene oxide-modified latices produce the highest wet pick values, i.e., greatest abrasion resistance, due to crosslinking with the urea-formaldehyde resin in paper coatings with or without hydroxyethyl methacrylate.

It should be noted that monomers other than those previously recited can be included in the latex copolymers of this invention so long as such monomers are not reactive in the system. For example, part of the monovinyl aromatic hydrocarbon monomer can be replaced with other rigidifying monomers such as acrylonitrile, methacrylonitrile, methyl acrylate and methyl methacrylate. Similarly, part of the aliphatic conjugated diene hydrocarbon monomer can be replaced with other flexibilizing monomers such as butyl acrylate and 2-ethylhexyl acrylate. In this manner the physical properties of the latex copolymer can be readily controlled. However, the latex copolymer can be prepared from monomer mixtures containing only about 0 to 20 weight percent of such other monomers.

The amount of the composition of this invention which should be employed in the treatment of paper and paper products depends on the type of paper or paper product and the physical characteristics of the embodiment of the composition. Enough of said composition should be employed to give good printability and good gloss. More than a minimum amount can be used to give some additional benefits such as improved color reproduction. The maximum amount of said composition which can be applied to paper is limited only to the amount of solids which can be retained by the paper base.

We claim:

1. A paper-coating composition consisting essentially of an aqueous dispersion of
    a latex copolymer prepared from at least 20 to 80 weight percent of at least one monovinyl aromatic hydrocarbon monomer, 15 to 60 weight percent of at least one aliphatic conjugated diene hydrocarbon monomer of 4 to 20 carbon atoms and 0.5 to 20 weight percent of at least one ethylenically unsaturated carboxylic acid containing no more than two carboxyl groups, a substantial number of the carboxyl groups having been modified by reaction with an epoxide containing from 1 to 2 oxirane rings, any other monomer being free of hydroxyl groups and being present in an amount no greater than 20 weight percent;
    at least one other colloidal water-dispersible polymer; and a pigment;
said latex copolymer and other colloidal water-dispersible polymer being present in a total amount of from about 5 to 20 weight percent of total solids, said pigment being present in a total amount of at least about 80 weight percent of total solids, and any other ingredients other than water being present in a total amount of from about 0.5 to 15 weight percent of total solids, said total solids being from 20 to 70 weight percent of said aqueous dispersion, the pH of said aqueous dispersion being in the range of 5 to 10.

2. A composition in accordance with claim 1 wherein said monovinyl aromatic hydrocarbon monomer is a styrene and said aliphatic conjugated diene hydrocarbon monomer is butadiene.

3. A composition in accordance with claim 2 wherein said other colloidal water-dispersible polymer consists essentially of starches.

4. A method of coating paper products which comprises
    1. completely coating the surface thereof with a composition consisting essentially of an aqueous dispersion of
        a latex copolymer prepared from at least 20 to 80 weight percent of at least one monovinyl aromatic hydrocarbon monomer, 15 to 60 weight percent of at least one aliphatic conjugated diene hydrocarbon monomer of 4 to 20 carbon atoms and 0.5 to 20 weight percent of at least one ethylenically unsaturated carboxylic acid containing no more than two carboxyl groups, a substantial number of the carboxyl groups having been modified by reaction with an epoxide containing from 1 to 2 oxirane rings, any other monomer being free of hydroxyl groups and being present in an amount no greater than 20 weight percent;
        at least one other colloidal water-dispersible polymer; and a pigment;
    said latex copolymer and other colloidal water-dispersible polymer being present in a total amount of from about 5 to 20 weight percent of total solids, said pigment being present in a total amount of at least about 80 weight percent of total solids, and any other ingredients other than water being present in a total amount of from about 0.5 to 15 weight percent of total solids, said total solids being from 20 to 70 weight percent of said aqueous dispersion, the pH of said aqueous dispersion being in the range of 5 to 10; and
    2. drying said coated paper.

5. A method in accordance with claim 4 wherein said monovinyl aromatic hydrocarbon monomer is a styrene and said aliphatic conjugated diene hydrocarbon monomer is butadiene.

6. A method in accordance with claim 5 wherein said other colloidal water-dispersible polymer consists essentially of starches.

7. A method in accordance with claim 6 wherein said epoxide has the formula

in which $R_1$ is a lower alkyl group of 1 to 7 carbon atoms.

8. A paper article at least one surface of which is coated with a composition consisting essentially of
- a copolymer prepared from at least 20 to 80 weight percent of at least one monovinyl aromatic hydrocarbon monomer, 15 to 60 weight percent of at least one aliphatic conjugated diene hydrocarbon monomer of 4 to 20 carbon atoms and 0.5 to 20 weight percent of at least one ethylenically unsaturated carboxylic acid containing no more than two carboxyl groups, a substantial number of the carboxyl groups having been modified by reaction with an epoxide containing from 1 to 2 oxirane rings, any other monomer being free of hydroxyl groups and being present in an amount no greater than 20 weight percent;
- at least one other colloidal water-dispersible polymer; and a pigment;

said latex copolymer and other colloidal water-dispersible polymer being present in a total amount of from about 5 to 20 weight percent of total solids, said pigment being present in a total amount of at least about 80 weight percent of total solids, and any other ingredients being present in a total amount of from about 0.5 to 15 weight percent of total solids, said total solids being from 20 to 70 weight percent of said aqueous dispersion, the pH of said aqueous dispersion being in the range of 5 to 10.

9. A paper article in accordance with claim 8 wherein said monovinyl aromatic hydrocarbon monomer is a styrene and said aliphatic conjugated diene hydrocarbon monomer is butadiene.

10. A paper article in accordance with claim 9 wherein said other colloidal water-dispersible polymer consists essentially of starches.

* * * * *